D. WELLINGTON.
WATER CLOSET BOWL.
No. 102,738.          Patented May 3, 1870.
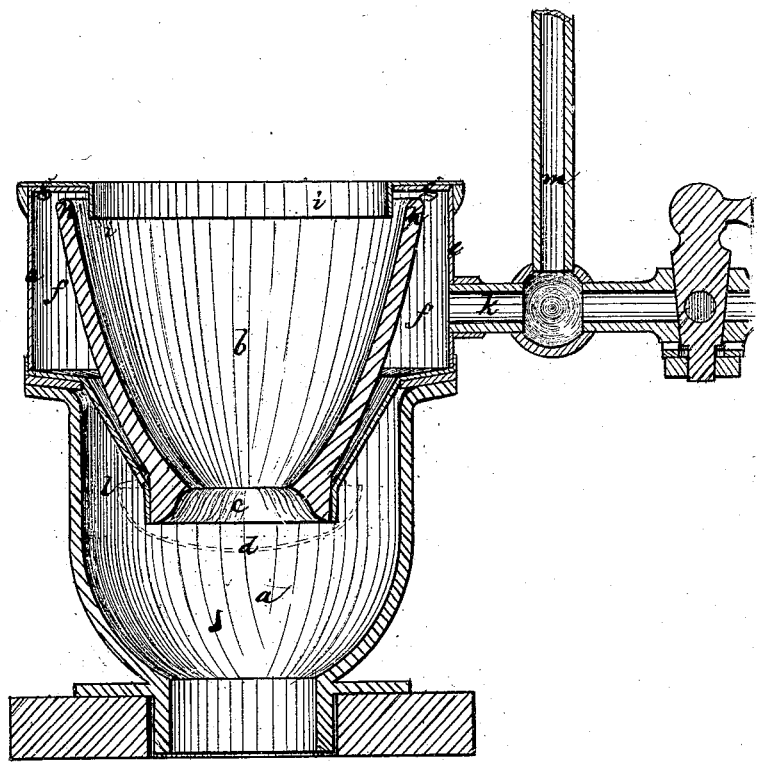

United States Patent Office.

DARIUS WELLINGTON, OF BOSTON, MASSACHUSETTS.

Letters Patent No. 102,738, dated May 3, 1870.

---

IMPROVEMENT IN WATER-CLOSET BOWLS.

---

The Schedule referred to in these Letters Patent and making part of the same.

---

*To all whom it may concern:*

Be it known that I, DARIUS WELLINGTON, of Boston, in the county of Suffolk and State of Massachusetts, have invented an Improvement in Water-Closet Bowls; and I do hereby declare that the following, taken in connection with the drawings which accompany and form part of this specification, is a description of my invention sufficient to enable those skilled in the art to practice it.

My invention relates to the construction and arrangement of the bowl of a water-closet with reference to the provision for washing the same from a head of water, and for "sealing" the outlet when the pan is raised.

In ordinarily-constructed water-closet bowls, which are made of porcelain or other vitrified ware, a hole is made through one side of the bowl, with an outwardly-protruding nozzle or neck, to which the water-supply pipe is connected, the opening into the bowl being covered by a flap, which throws the water in opposite directions around the sides of the bowl, to cause all adhering matters to be washed therefrom.

The bowl thus made is necessarily weakened by reason of this hole made through its side, and in packing and transportation many bowls are broken by reason of this weakness, and many of the nozzles are broken off.

The object of my invention is to so make and arrange the bowl that it shall have no opening whatever through its side, but shall be washed by water pouring over and all around its upper edge; and My invention consists, primarily, in a water-closet bowl having imperforate sides, and encased in an auxiliary bowl or water-chamber, which, being filled or charged from the source of water-supply to the closet, overflows the inner bowl all around the upper edge thereof.

The drawing represents a section of a bowl embodying and arranged in accordance with my invention.

*a* denotes the container, over and into the top of which the bowl sits, and from the bottom of which the soil-pipe leads.

*b* denotes the bowl.

*c*, the open bottom thereof.

*d*, the pan, shown in position by dotted lines, the bottom of the bowl sitting into the pan.

The bowl is shown as supported by and standing upon the contracted bottom of a casing, *e*, of a chamber, *f*, which surrounds the bowl, a flange or ring, *g*, on top of this chamber projecting inwardly over the upper edge or rim *h* of the bowl *b*, and having a lip or flange, *i*, projecting down into the top of the bowl, as seen in the drawing.

Into one side of the chamber *f* enters the pipe *k*, which leads from the water-supply above, this pipe being provided with a suitable cock, to be opened and closed simultaneously with the fall and rise of the pan *d*.

The chamber *f* extends all around the bowl *b*, and down to, or nearly to, the bottom thereof, as seen in the drawing; and, when the cock is opened, the water flows into this chamber, and fills it, and then overflows the top of the bowl *b*, and runs freely down over the whole inner surface of the bowl, thoroughly cleansing it from all impurities, the pan being dropped to let the water flow into the container *a*, and thence into the soil-pipe.

At the lower part of the chamber *f* is a small outlet, *l*, of such size as not to interfere materially with the filling of the chamber *f* when the water-supply-cock is open, but sufficiently large to drain off the water from the chamber when the cock is closed.

This orifice opens into or just above the pan *d*, so that, when the cock is closed, and the pan is up, the water draining or running off from the chamber *f* will fill the pan, or cause the water to rise in it to such height as to seal the bottom or opening *c* of the bowl *b*; and the chamber *f* may be made of a capacity sufficient to contain only water enough to fill or seal the pan.

When the water-supply cock is closed, and the water has drained from the chamber *f*, such chamber and the bowl are, of course, empty and free from water-pressure; and, to ventilate the bowl, I lead an air-pipe, *m*, either from the pipe *k*, between the cock and the chamber *f*, or directly from the chamber *f*, this pipe leading into a chimney or flue, and allowing all mephitic gases to escape into the open air.

Ordinary bowls are not only made with the opening and nozzle at one side, but each has an inward flange at its top, to prevent the splashing of water up over the edge of the bowl; but by employing the bowl *b* and surrounding water-chamber, the necessity for this bowl-flange is obviated.

It will, therefore, be obvious that the bowl *b* may be made very cheaply, as the flange or lip at the top of a common bowl and the nozzle and hole at the side thereof add very greatly to the cost thereof, and the loss occasioned by breakage of these flanges and nozzles is very great, such breakage often amounting to from ten to fifteen per cent. of the importation of these bowls, which, as before remarked, are made of porcelain or other vitrified earthenware.

By arranging a bowl and an overflow chamber, as described, I avoid the necessity of employing a slow-closing cock to effect the sealing of the bowl, such cocks being, as is well known, complicated, expensive, and liable to constant derangement of their parts.

I claim—

In combination with the bowl $b$, the surrounding water-chamber $f$, into which the water-supply pipe $k$ opens, and from which the water overflows into the bowl, substantially as described.

Also, in combination with the above, the orifice $l$, leading from the chamber, and discharging water into the bowl. substantially as described.

DARIUS WELLINGTON.

Witnesses:
 J. B. CROSBY,
 FRANCIS GOULD.